United States Patent
De Freitas Cunha et al.

(10) Patent No.: US 11,477,133 B2
(45) Date of Patent: Oct. 18, 2022

(54) INTERNET ACTIVITY COMPARTMENTALIZATION

(71) Applicant: International Business Machines Corporation, Armonk, NY (US)

(72) Inventors: Renato Luiz De Freitas Cunha, São Paulo (BR); Ana Paula Appel, São Paulo (BR); Lucas Correia Villa Real, São Paulo (BR); Henrique Von Atzingen Do Amaral, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 16/518,307

(22) Filed: Jul. 22, 2019

(65) Prior Publication Data

US 2021/0029055 A1    Jan. 28, 2021

(51) Int. Cl.
*G06F 15/173* (2006.01)
*H04L 47/72* (2022.01)
*H04L 47/80* (2022.01)
*H04L 47/70* (2022.01)
*H04L 47/78* (2022.01)

(52) U.S. Cl.
CPC .............. *H04L 47/72* (2013.01); *H04L 47/78* (2013.01); *H04L 47/808* (2013.01); *H04L 47/821* (2013.01)

(58) Field of Classification Search
CPC ....... H04L 47/72; H04L 47/78; H04L 47/808; H04L 47/821
USPC .......................................... 709/220, 226–227
See application file for complete search history.

(56) References Cited

U.S. PATENT DOCUMENTS

| | | | |
|---|---|---|---|
| 6,289,462 | B1 | 9/2001 | McNabb et al. |
| 7,979,791 | B2 | 7/2011 | Yang et al. |
| 8,087,035 | B2 | 12/2011 | Jurova et al. |
| 8,434,093 | B2 | 4/2013 | Larimore et al. |
| 8,769,268 | B2 | 7/2014 | Morozov et al. |

(Continued)

FOREIGN PATENT DOCUMENTS

| | | | |
|---|---|---|---|
| CN | 1842008 A | | 10/2006 |
| CN | 102316163 A | | 1/2012 |

(Continued)

OTHER PUBLICATIONS

PCT Notification of Transmittal of the International Search Report and the Written Opinion of the International Searching Authority, or the Declaration for Application No. PCT/IB2020/056732 dated Nov. 3, 2020.

(Continued)

*Primary Examiner* — Farzana B Huq
(74) *Attorney, Agent, or Firm* — Patterson + Sheridan, LLP

(57) ABSTRACT

A system for initiating web containers and isolating network traffic to web containers is described. The system initiates and uses web containers for associated web-based resources, such as domain addresses owned by a single entity. When a web container for a domain address has not been initiated, the system determines an owner of the domain address and any domain addresses associated with the owner and initiates a web container for the domain address and the associated domains. When a user navigates to the domain addresses associated with the determined owner, the system isolates the network activity to the initiated web container.

20 Claims, 7 Drawing Sheets

(56) References Cited

U.S. PATENT DOCUMENTS

| | | |
|---|---|---|
| 9,195,446 B2 | 11/2015 | Fiebig et al. |
| 9,338,127 B2 | 5/2016 | Rajamanickam et al. |
| 9,635,034 B2 | 4/2017 | Jamison et al. |
| 9,787,668 B1 | 10/2017 | Marathe et al. |
| 2002/0173984 A1* | 11/2002 | Robertson ............... H04L 67/34 709/220 |
| 2011/0029856 A1 | 2/2011 | Shekar |
| 2011/0078309 A1* | 3/2011 | Bloch ................. H04L 63/0236 709/224 |
| 2013/0139165 A1* | 5/2013 | Doukhvalov ......... G06F 21/567 718/102 |
| 2013/0340028 A1 | 12/2013 | Rajagopal et al. |
| 2014/0006347 A1* | 1/2014 | Qureshi ................ H04W 4/029 707/621 |
| 2014/0090009 A1 | 3/2014 | Li et al. |
| 2014/0095974 A1 | 4/2014 | Cui et al. |
| 2014/0337526 A1 | 11/2014 | Amishav et al. |
| 2014/0359519 A1 | 12/2014 | Luu et al. |
| 2015/0058923 A1 | 2/2015 | Rajagopal et al. |
| 2016/0014038 A1 | 1/2016 | Thyagarajan et al. |
| 2017/0199910 A1 | 7/2017 | Konik et al. |
| 2018/0091610 A1* | 3/2018 | Liu ......................... H04L 67/02 |
| 2018/0152841 A1 | 5/2018 | Shah et al. |
| 2018/0287883 A1* | 10/2018 | Joshi .................... G06F 9/45558 |
| 2018/0359218 A1* | 12/2018 | Church ............... H04L 63/0272 |
| 2020/0387599 A1* | 12/2020 | Du ......................... G06N 20/00 |

FOREIGN PATENT DOCUMENTS

| | | |
|---|---|---|
| CN | 105430110 A | 3/2016 |
| CN | 105468362 A | 4/2016 |
| CN | 106133688 A | 11/2016 |
| CN | 106663035 A | 5/2017 |
| CN | 107566541 A | 1/2018 |
| CN | 109788082 A | 5/2019 |
| CN | 109923522 A | 6/2019 |
| WO | 2018089318 A1 | 5/2018 |

OTHER PUBLICATIONS

Bo et al., "A Web Container Integration Framework in J2EE Application Servers," Journal of Software, Vo. 17, No. 5, Dated: May 2006, pp. 1195-1203 [Abstract Only].

Xiao Weiman et al., "Lightweight Virtualization solution for Web Runtime based on Container," Application Research of Computers, vol. 35, No. 6, Dated Jun. 2018, pp. 1768-1772 [Abstract Only].

Yu Peng, Quanyuan Wu, "Secure Communication and Access Control for Web Services Container," Proceedings of the Fifth International Conference on Grid and Cooperative Computing, IEEE, Year: 2006, pp. 1-4.

China National Intellectual Property Administration, Notification of The First Office Action for Chinese Application 2020800488771 dated Aug. 9, 2022.

* cited by examiner

INTERNET ACTIVITY COMPARTMENTALIZATION

BACKGROUND

The present disclosure relates to providing privacy and network traffic isolation, and more specifically, to creating web containers and isolating network activity and network traffic to the web containers.

Web tracking technology can track a user across the Internet, including different websites, services, and web browsers. Users may implement ad hoc solutions to prevent being tracked, but these ad hoc solutions are difficult to implement and can prevent beneficial and/or wanted tracking of Internet activity.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving a first domain address for a first internet-based resource, determining from a web container repository, that the first domain address is not associated with an initiated web container environment, querying an owner database to determine a first owner for the first domain address, and querying a reverse-owner database to determine an associated set of domain addresses including one or more domain addresses associated with the first owner. The method also includes initiating a first web container for the first domain address and the associated set of domain addresses by allocating computing resources for the first web container, storing an identification of the first web container with an association to the first domain address, and the associated set of domain addresses in the web container repository, isolating network activity with the first internet-based resource using the first web container, and storing data associated with the network activity in the first web container. Other embodiments of this aspect include corresponding computer systems, apparatus, and computer programs recorded on one or more computer storage devices, each configured to perform the actions of the methods.

One example embodiment includes a system including: a computer processor; and a memory containing a program which when executed by the computer processor performs an operation. The operation includes: receiving a first domain address for a first internet-based resource, determining from a web container repository, that the first domain address is not associated with an initiated web container environment, querying an owner database to determine a first owner for the first domain address, and querying a reverse-owner database to determine an associated set of domain addresses including one or more domain addresses associated with the first owner. The operation also includes initiating a first web container for the first domain address and the associated set of domain addresses by allocating computing resources for the first web container, storing an identification of the first web container with an association to the first domain address, and the associated set of domain addresses in the web container repository, isolating network activity with the first internet-based resource using the first web container, and storing data associated with the network activity in the first web container.

One example embodiment includes a computer program product for permissioned image compilation, the computer program product including: a computer-readable storage medium having computer-readable program code embodied therewith, the computer-readable program code executable by one or more computer processors to perform an operation. The operation including: receiving a first domain address for a first internet-based resource; determining from a web container repository, that the first domain address is not associated with an initiated web container environment, querying an owner database to determine a first owner for the first domain address, and querying a reverse-owner database to determine an associated set of domain addresses including one or more domain addresses associated with the first owner. The operation also includes initiating a first web container for the first domain address and the associated set of domain addresses by allocating computing resources for the first web container; storing an identification of the first web container with an association to the first domain address, and the associated set of domain addresses in the web container repository, isolating network activity with the first internet-based resource using the first web container, and storing data associated with the network activity in the first web container.

DETAILED DESCRIPTION

Figure 1:
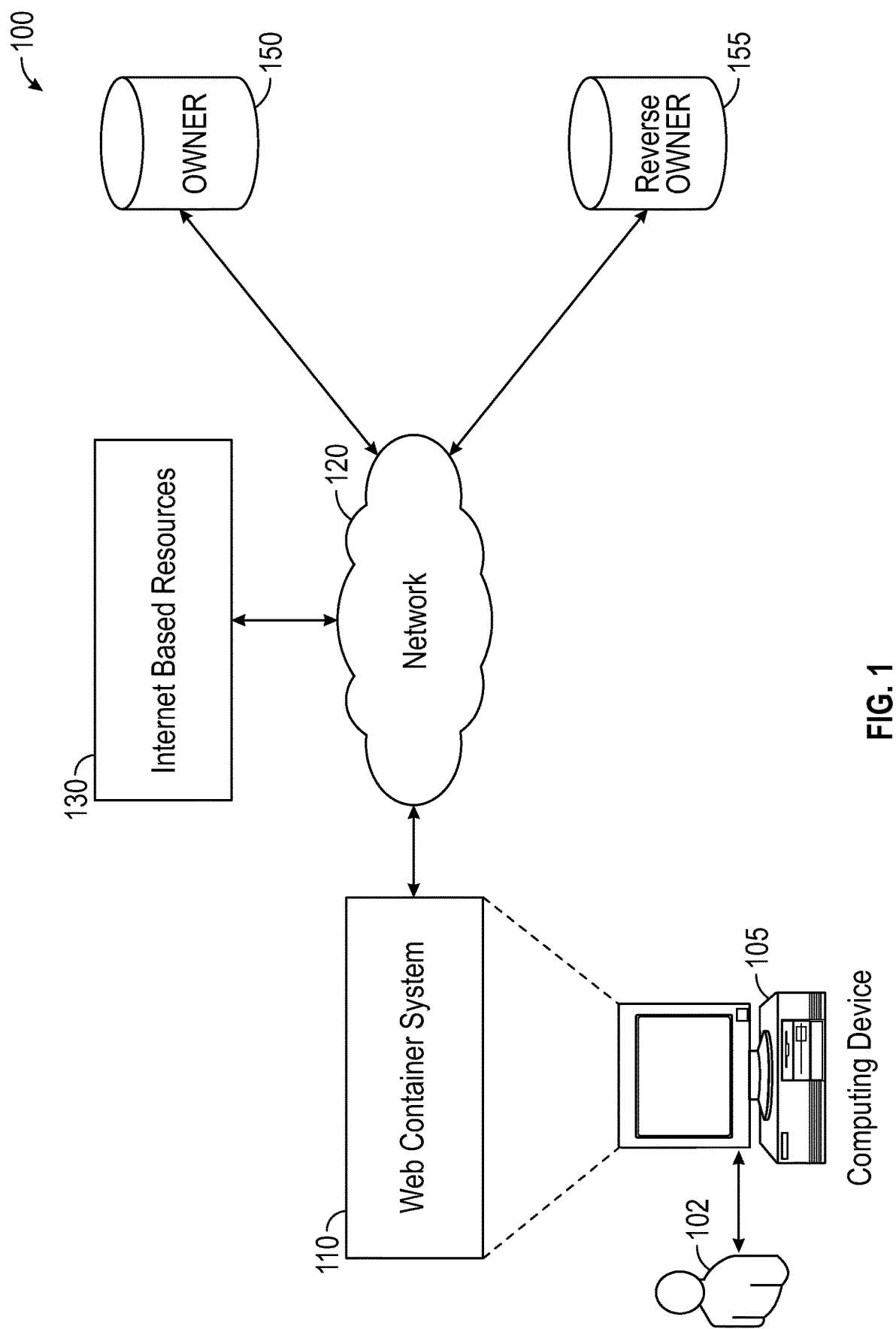
FIG. 1 illustrates a network system, according to one embodiment.

Individuals spend large amounts of time accessing and using various websites and services that are based on the Internet. Companies that provide the services desire to understand the user behavior in order to improve the websites and services as well as to monetize the user interactions. The growing use of the Internet and the desire to monetize has led to large amounts of user data mining and tracking of web-based activity.

As web tracking technology increases and advances, users of various networked services can benefit from the ease of access to the services that web tracking and associated information storage can provide. For example, tracking and user information storage provides for a user and/or a web browser to store login information and/or other identifying information so that a user can move from website to website and service to service without repeatedly providing input login and other identification information. Moreover, the business model for many Internet services relies on tracking of user's activity for advertisements, user behavior analytics, etc. For example, users are provided free email, but the user's email and user tracking data are used for targeted advertisements.

Although users may agree with and allow some level of tracking, many do not want all of their network activity and data tracked and shared across the Internet. To address these concerns, many web services and browser programs offer various privacy focused solutions including offering private browsing options, do-not-track (DNT) options, and web tracking isolation services, such as web containers, among others. While, these options address user privacy concerns on some level, each of these options fails to provide a way for users to easily allow for some tracking for some services while also providing isolation of other types of activity tracking. For example, private browsing does not store user information, such that when a user ends a private browsing session, all the information associated with the browsing session is deleted. In some cases, DNT options are ignored by some Internet-based services such that even though a user may indicate tracking is not desired, the tracking occurs anyway. Additionally, some browsers and services turn on DNT automatically for all websites, which overrides a user's decision to decide when DNT should, or should not, be enabled.

In another example solution, web containers provide for a web browser to behave differently depending on the website being visited. For example, the browser maintains entirely different sets of cookies, history, extensions, and other attributes in each web container, thus limiting how companies can track a user. However, web container setup processes are error-prone and require users to manually configure and maintain containers themselves. This limits effective setup of web containers to only those users with the technological skills to configure the web containers. Furthermore, in many cases users end up misusing web containers by either creating fewer containers than the ideal (thus letting many different websites owned by different organizations to track them) or by creating too many containers (impacting their browsing experience when navigating different related services).

The methods and systems described herein allow for a compromise between the user's desire to limit tracking of Internet activity while also providing for a level of tracking for some websites and services, such as those services and websites owned by a common company or entity. The systems described herein provides for limited and focused user data tracking by initiating web containers based on the ownership of web domain addresses and isolating the network activity associated with each domain address to the specific web container. Domains not associated with the owner of the domains in a web container are isolated in a different web container.

FIG. 1 illustrates a network system, according to one embodiment. The network system 100 includes the network 120 which includes any network type between computing entities and networked resources, such as the Internet. The network system 100 also includes the user 102, the computing device 105, and the web container system 110 installed on the computing device 105. In some examples, the user 102 uses the computing device 105 and applications and/or web browsers on the computing device to access Internet-based resources 130. In some examples, the user 102 interacts with the computing device 105 using a web browser, an application installed on the computing device 105, and/or another service which accesses the network 120 and the Internet-based resources 130. The Internet-based resources include websites, web-based services, and other programs and applications hosted and/or accessed via the Internet (e.g., the network 120). In some examples, the Internet-based resources are associated with one or more domain addresses identifying locations and methods to access the Internet-based resources.

As described herein, the web container system 110 interacts with the domain addresses received from the user 102 and/or other service associated with accessing the Internet-based resources 130, via the computing device 105. The domain addresses may include a Uniform Resource Locator (URL) and/or other identification of a location of the Internet-based resource requested by the user 102 and/or other service executing on the computing device 105.

The web container system 110 determines when a web container has been initiated for the domain address and/or the Internet-based resource. In an example where a web container is identified, the network activity/traffic is isolated to the identified container. In an example, where the domain address is not associated with a container, the web container system 110 begins a process for initiating a web container for the domain address. For example, the web container system 110 queries an owner database 150 and a reverse owner database 155 to determine an owner and associated domain addresses for a domain address received from the user 102, as described in further detail in relation to FIG. 2A-5.

Figure 2A:
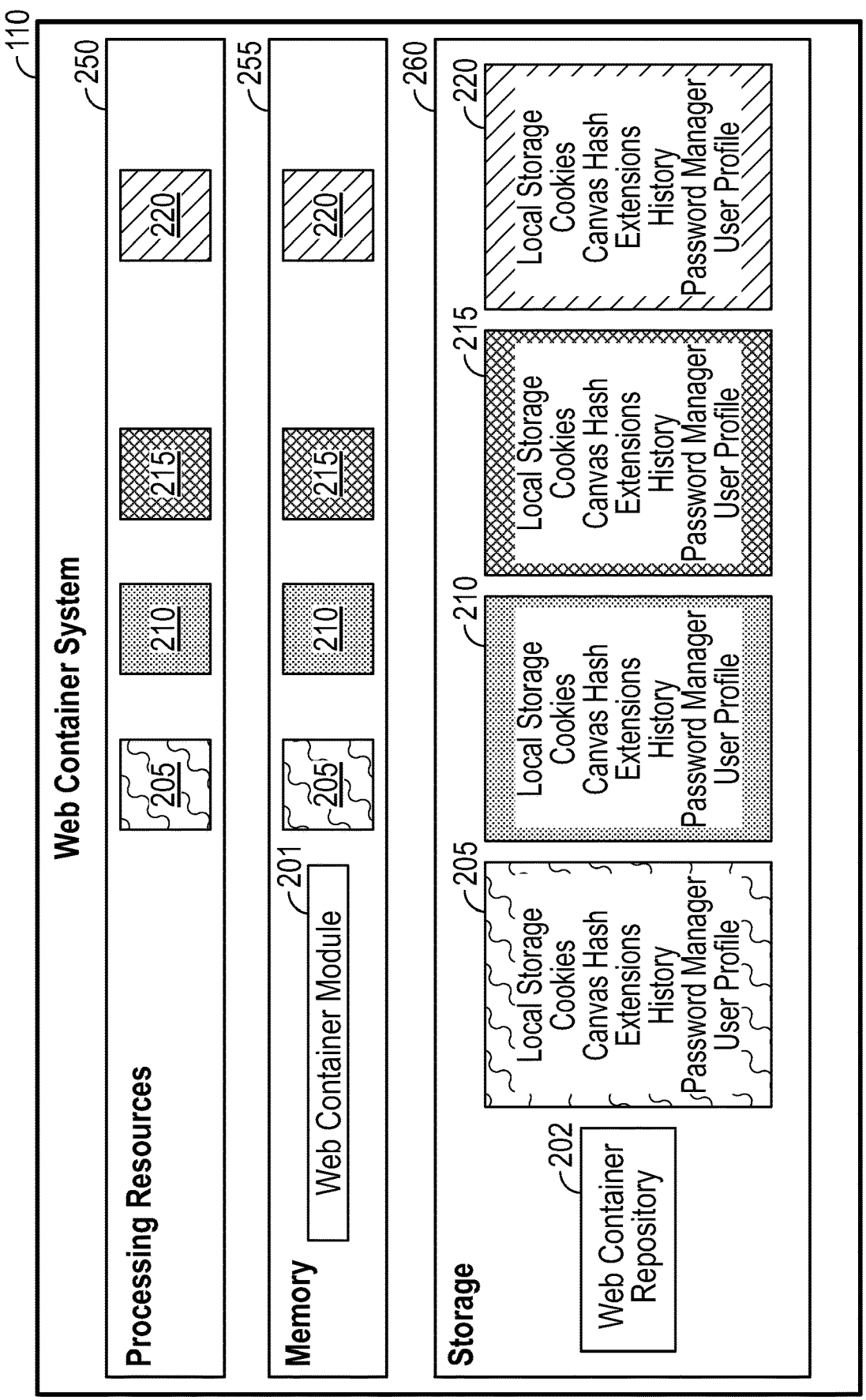
FIG. 2A illustrates a web container system, according to one embodiment.

FIG. 2A illustrates a web container system, according to one embodiment. As described in relation to FIG. 1, the web container system 110 may be installed on a personal computer, mobile device, and/or other computing device used for Internet/network access. In some examples, the web container system 110 includes an independent application and/or program installed on the computing device 105 to perform the methods described herein. In some examples, the web container system 110 functions as a web browser system and/or an extension to a web browser or other application. The web container system 110 in FIG. 2A is shown as a general computing system. The web container system 110 includes processing resources 250, memory 255, and storage 260, which are described in further detail in relation to FIG. 6. The web container system 110 also includes web container module 201 in the memory 255, where the web container module 201 includes instructions to perform the functions and methods described herein. For example, the web container module 201 interacts with the processing resources 250, the memory 255, and the storage 260 to initiate web container environments (web containers) such as web containers 205, 210, 215, and 220.

In some examples, the web containers are initiated by allocation of processing resources, memory, and storage for use by the respective web containers. The allocation of the processing resource may include a virtual allocation and/or a physical allocation of computing resources for each web container. For example, portions of the processing resources 250, memory 255, and storage 260 are allocated/reserved for each of the containers as shown in FIG. 2A. In some examples, the web container module 201 stores an identification of initiated web containers with an association to any domain address that are to be browsed/isolated in the web container in a web container repository 202.

Figure 2B:
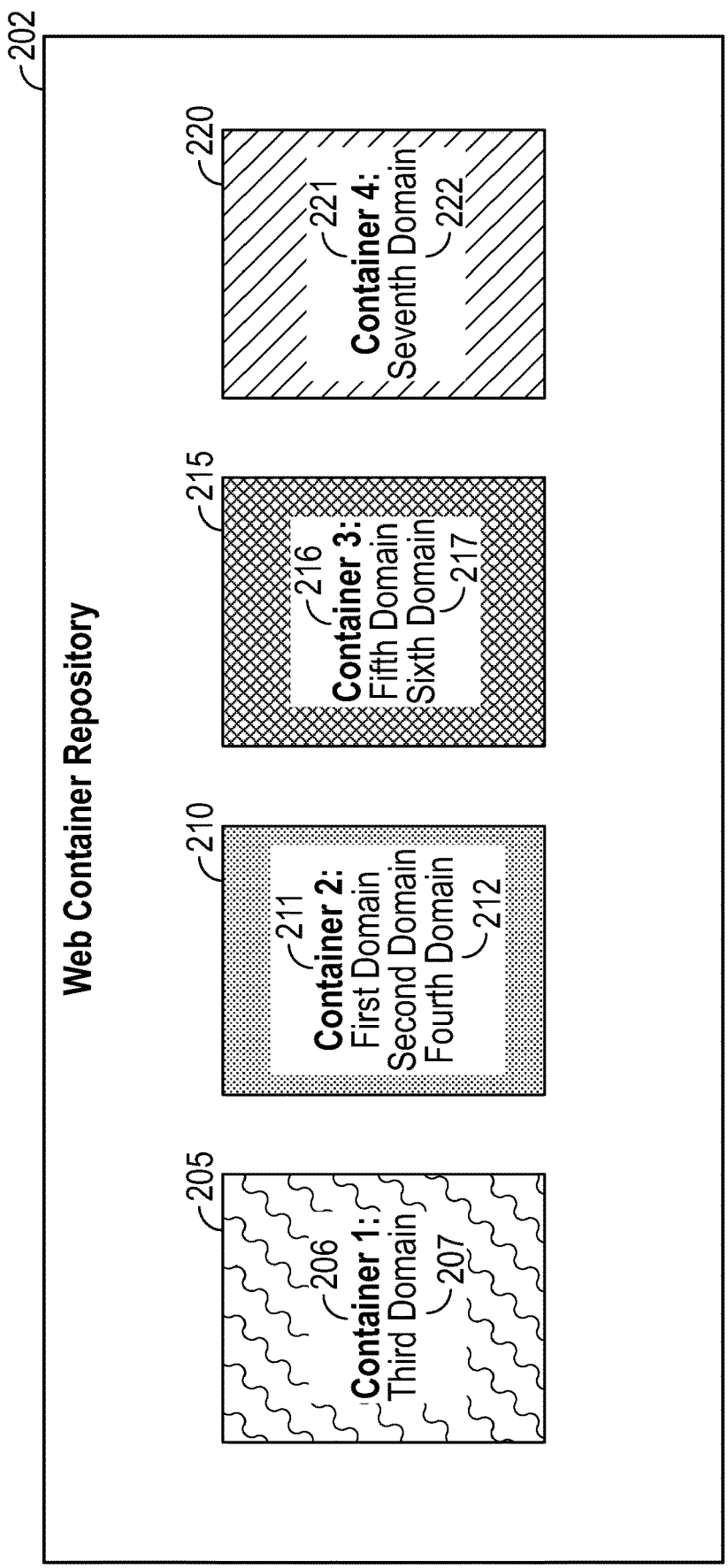
FIG. 2B illustrates a web container repository, according to one embodiment.

FIG. 2B illustrates a web container repository, according to one embodiment. The web container repository 202 provides for the web container module 201 to quickly determine when a web container is previously initiated/available for a given domain address upon receipt of the domain address. In some examples, the identification of the web container is stored with domain addresses associated with a common entity. For example, the container 205 includes container identification 206 and associated domain addresses 207. Likewise, the web container 210 includes the container identification 211 and associated domain addresses 212, the container 215 includes the container identification 216 and associated domain addresses 217, and the web container 220 includes the container identification 221 and associated domain addresses 222. As described herein, the associated domain addresses include all of the domain addresses associated with a specific owner as determined by querying the owner database 150 and the reverse owner database 155.

For example, a social media company A may own several subsidiary social media properties. For example, company A may own first domain, second domain, and fourth domain which each correlate to different social media services. As the web container system 110 receives domain addresses for Internet-based resources, the web container module 201 determines from the web container repository 202 when a web container is initiated for the domain address by checking the associated domains addresses in the web container repository 202 (e.g., associated domain addresses 207, 212, 217, and 222).

In the example of social media company A, the web container 210 is determined to include the domain addresses for the company A and is used for all of the activity tracking and information storage for the related social media services. For example, as shown in FIG. 2A, local storage, cookies, canvas hash, extensions, browser history, password managers, and user profiles may be stored on the allocated storage for the web container 210 on the storage 260. Thus as the user 102 transitions from first domain to second domain to fourth domain, the user's login, identification, and other tracking information is provided to each of the services associated with the web container 210. In some examples, the user 102 is provided with visual indications of isolated activity and the use of web containers as described in relation to FIG. 3.

Figure 3:
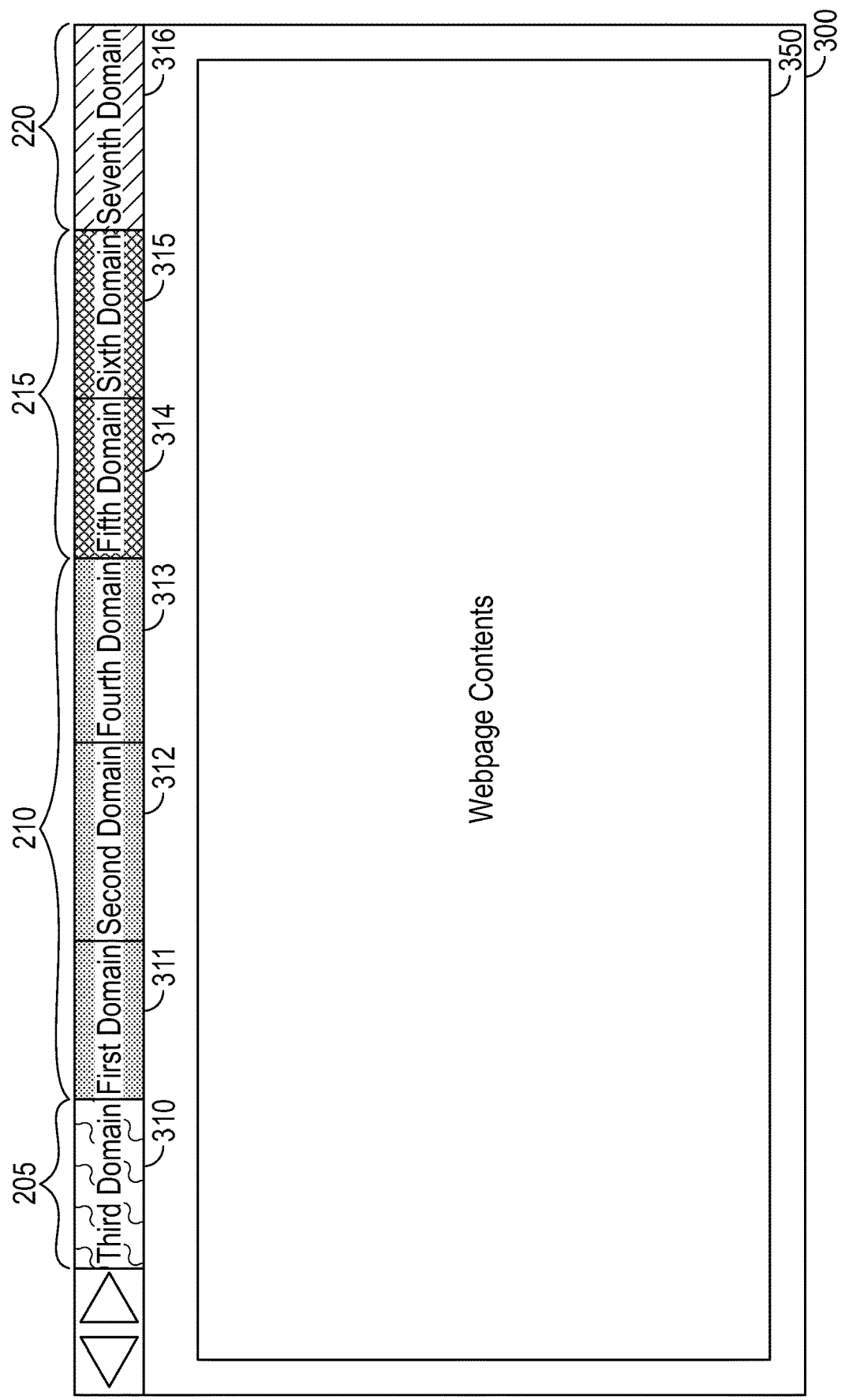
FIG. 3 illustrates a user interface for a web container system, according to one embodiment.

FIG. 3 illustrates a user interface for a web container system, according to one embodiment. For example, the web container system 110 and an associated browser window 300 displays information and content from the Internet-based resources 130 in the various browser tabs 310-316. As shown in FIG. 3, webpage contents 350 from the Internet-based resources associated with a third domain are displayed in the browser window 300. In some examples, the web container module 201 determines from the web container repository 202 that the third domain is associated with the container 205 and isolates the network activity (including the interactions with the Internet-based resources from the third domain) to the container 205. In some examples, the browser window 300 includes a visual identification of each of the various web containers to provide the user with a visual indication of which activity is tracked. For example, as shown, the browser tabs in the browser window for each of the various domain addresses includes a visual indication such as color, size, shape, shading, etc. to indicate in which container the browser tab is operating. As the user 102 navigates to additional domain addresses associated with varying web containers, the browser window 300 and associated visual indications are updated to reflect the current web container.

Figure 4:
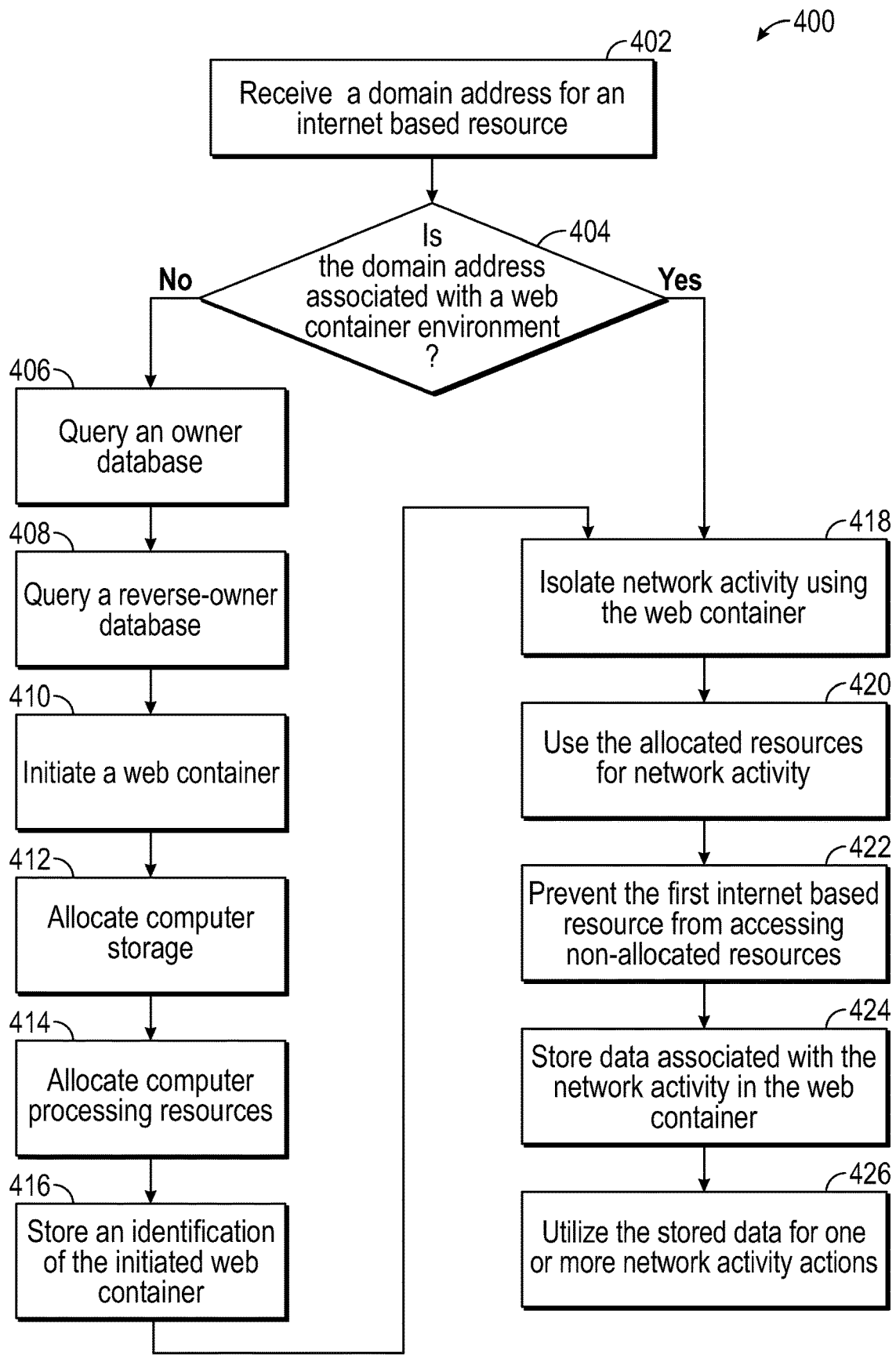
FIG. 4 illustrates a method for a web container system, according to embodiments described herein.

FIG. 4 illustrates a method for a web container system, according to embodiments described herein. Method 400 begins at block 402 where the web container system 110 receives a domain address for an Internet-based resource. In some examples, the user 102 interacts with an application or other service on the computing device 105 which requests an Internet-based resource from the Internet-based resources 130 using a domain address. The user 102 may also enter a first domain address such as a "first domain" in an interface associated with the computing device 105 and the web container system 110. For example, the user 102 enters the first domain address in the browser window 300 and the browser provides the domain address to the web container system 110. In these examples, the web container system 110 receives the first domain address for a first Internet-based resource in the Internet-based resources 130 (e.g., a website hosted at the first domain address) prior to the computing device accessing the network 120 for the Internet-based resource. As described herein, the web container system 110 may also receive a plurality of domain addresses including at least a second domain address for a second Internet-based resource in the Internet-based resources 130 (e.g., a second website hosted at the second domain address).

At block 404, the web container system 110 determines whether a domain address is associated with a web container environment. In general, when a domain address is associated with an initiated web container, the web container is used for the network activity associated with the domain address. When a web container is not found for the domain address, the web container system 110 proceeds to an initiation process.

Figure 5:
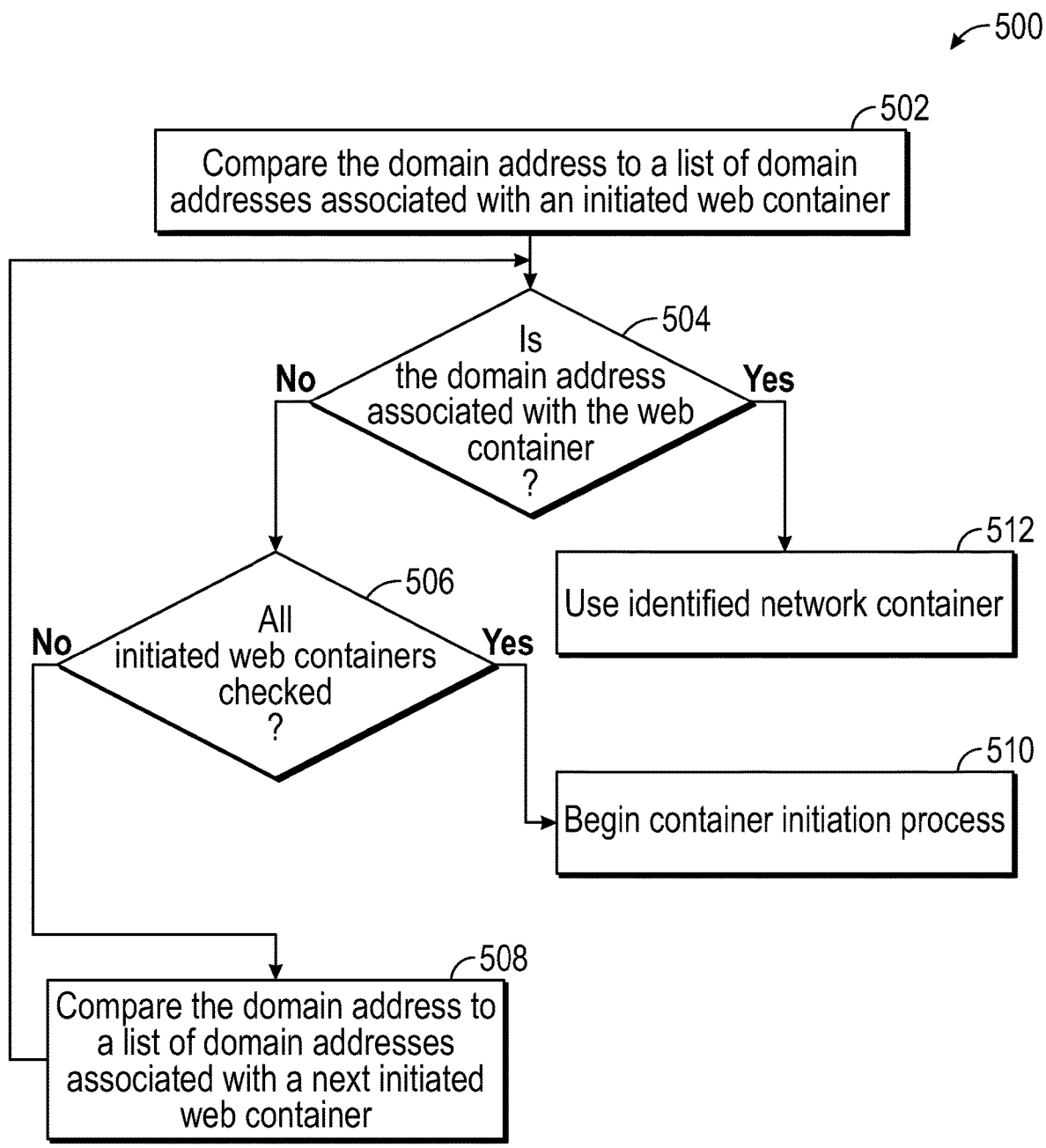
FIG. 5 illustrates a method for determining a domain address association, according to one embodiment.

For example, the web container system 110 accesses the web container repository 202 to determine when a domain address received at the web container system 110 is associated with a previously initiated web container as described in relation to FIG. 5 which illustrates a method 500 for determining a domain address association. Method 500 begins at block 502 where the web container system 110 compares a domain address to a list of domain addresses associated with an initiated web container. For example, at a first time when the container 210 has not been initiated by the web container system 110, the web container system 110 compares the first domain to the stored components of initiated web container 205 in the web container repository 202 including the container identification 206 and the associated domain addresses 207. At block 504, the web container system 110 determines from the comparison whether the domain address is listed in the associated set of domain addresses. In the above example, the first domain is not stored in the associated domain addresses 207, thus method 500 proceeds to block 506.

In an example, where the received domain address is associated with the web container, method 500 proceeds to block 512, where the web container system uses the identified network container (such as discussed in relation to blocks 418-426 of FIG. 4 described herein). For example, when the web container system 110 receives the third domain address, the comparison indicates that the third domain is stored in the associated domain addresses 207 of web container 205 and the method 500 proceeds to block 512. Likewise, in an example, at a time after the container 210 has been initiated, the comparison of the second domain with the associated domain addresses 212 indicates that the second domain is associated with the web container 210 and the method 500 proceeds to block 512 to utilize the web container 210 for network activity associated with the second domain.

As discussed above, when the domain address is not associated with a checked container, method 500 proceeds to block 506. At block 506, the web container system 110 determines when all initiated web containers in the web container repository 202 have been checked. For example, when the first domain address is not stored in the associated domain addresses 207, the method 500 proceeds to block 508 to compare the domain address with the associated domain addresses of the next container(s) (container 215, and subsequently web container 220) in a similar manner as described in relation to block 502, until all the initiated web containers in the web container repository 202 have been checked.

In an example, where all the web containers in the web container repository 202 are checked and an associated web container is not found, the method 500 proceeds to block 510 where the web container system 110 begins a container initiation process as described in relation to blocks 406-416 in FIG. 4.

Returning to FIG. 4, at block 406, the web container system 110 queries an owner database when the domain address is not associated with a web container environment. For example, for the first domain the web container system 110 queries the owner database 150 to determine a first owner for the first domain address. At block 408, the web container system 110 queries a reverse-owner database. For example, the system queries a reverse-owner database to determine an associated set of domain addresses comprising one or more domain addresses associated with the first owner. As shown in FIG. 2B, the reverse owner database 155 returns the second domain and the fourth domain for the first owner. In some examples, the owner database 150 and the reverse owner database 155 comprise a WHOIS and a reverse WHOIS databases, respectively. The WHOIS protocol and service is defined in RFC (request for comments) 3912 of the Internet Engineering Task Force (IETF) and provides the infrastructure and the protocol(s) for implementing the owner database. Likewise, ongoing developments at the IETF for extending the Registration Data Access Protocol (RDAP) to support reverse search capabilities in the reverse owner database.

While described in relation to the owners of the domain addresses, other associations may also be determined and/or received from the owner database 150 and the reverse owner database 155 (e.g., the reverse owner database 155 returns associated domain addresses including domains not owned by but still related to the identified owner such that the related domains are included in the same web container). In some examples, the web container system 110 sets additional relations between web containers such that the web containers include multiple owners of domains, etc.

At block 410, the web container system 110 initiates a web container. For example, the web container system 110 initiates a first web container (e.g., the web container 210) for the first domain address and the associated set of domain addresses (e.g., the second domain and the fourth domain). In some examples, the first web container is initiated by the web container module 201 using a standard web container protocol. In some examples, the web container system 110 initiates the first web container by allocating computing resources for the first web container (e.g., allocated resources for the first container, the web container 210). For example, at block 412 and as shown in relation to FIG. 2A, the web container system 110 allocates computer storage within the storage 260 and the memory 255 for use by the web container 210. Similarly, at block 414, the web container system 110 allocates computer processing resources for use by the web container 210 within the processing resources 250.

At block 416, the web container system 110 stores an identification of the initiated web container. For example, the web container system 110 stores an identification of the first web container (e.g., the container identification 211 for the web container 210) with an association to the first domain address, and the associated set of domain addresses (e.g., associated domain addresses 212) in the web container repository.

At block 418, the web container system 110 isolates network activity using the web container. For example, the web container system 110 isolates network activity with the first Internet-based resource associated with the first domain using the web container 210. In other examples, as the user 102 navigates to other domain addresses to access other Internet-based resources, the web container system 110 isolates the network activity to the other Internet-based resources based on the appropriate container. For example, when the user requests a sixth domain address, the web container system uses the web container 215 for the network activity associated with the sixth domain address.

At block 420, the web container system 110 uses the allocated resources for network activity. For example, for each web container, the web container system 110 uses the allocated processing resources and storage for the web container 210 for the network activity associated with the first, second, and fourth domains listed in the associated domain addresses 212.

At block 422, the web container system 110 prevents the first Internet-based resource from accessing non-allocated resources. For example, the web container system 110 prevents the Internet-based resources from accessing and/or using non-allocated resources. The use of the web containers for network activity for domains in the associated sets and prevention from accessing non-allocated computing resources provides for some tracking across associated domains while also providing user privacy across different services and websites.

At block 424, the web container system 110 stores data associated with the network activity in the web container. For example, the web container system 110 stores information such as a plurality of web-based tracking information, one or more browser extensions, a network access history, and user profile information for one or more Internet-based resources. For example, as the user interacts with the Internet resources associated with the associated domain addresses 212, the web container stores the local storages, cookies, canvas hash, extensions, browser history, passwords, and user profiles in the web container 210 storage. This allows for the user 102 and other services to seamlessly transition among the associated domains while preventing this information from being used by non-associated domains and Internet resources.

At block 426, the web container system 110 utilizes the stored data for one or more network activity actions. For example, for each web container, the web container system 110 accesses and provides the stored user profile information, tracking information, etc. during network activity while preventing the information from being accessed by Internet-based resources outside of the container.

Figure 6:
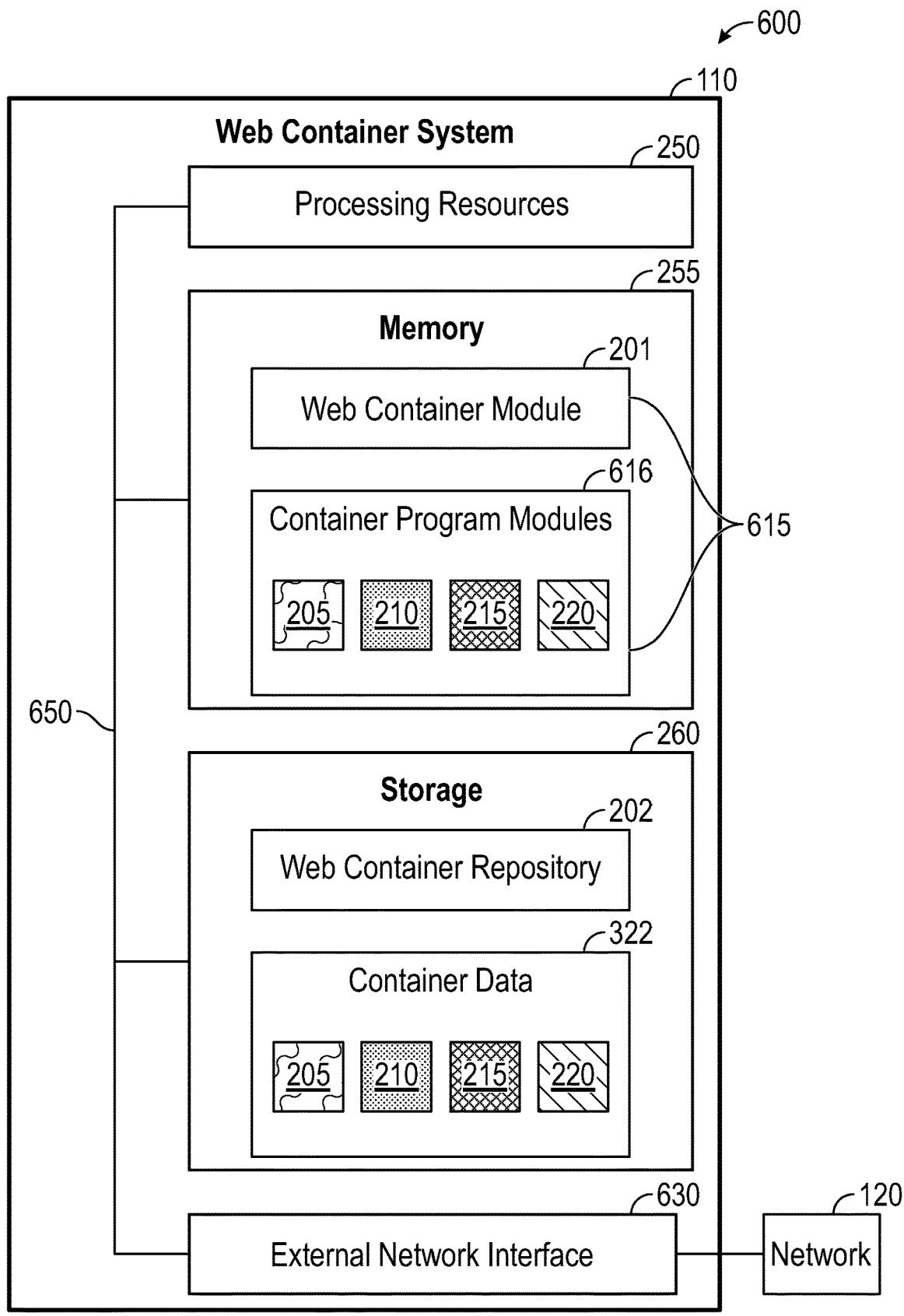
FIG. 6 illustrates a block diagram of a web container system, according to one embodiment.

FIG. 6 illustrates a block diagram of a web container system, according to one embodiment. The arrangement 600 may include a computer embodied as web container system 110 and configured to perform the methods described herein. The web container system 110 is shown in the form of a general-purpose computing device. The components of web container system 110 may include, but are not limited to, one or more processors, processing units, or processing resources 250, a system memory, memory 255, a storage system, storage 260, network interface 630, and a bus 650 that couples various system components including the system memory, memory 255 and storage system, storage 260, to processing resources 250 along with the network interface 630 and various input/output components and a network 120. In other embodiments, arrangement 600 is distributed and includes a plurality of discrete computing devices that are connected through wired or wireless networking.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Web container system 110 typically includes a variety of computer system readable media. Such media may be any available media that is accessible by web container system 110, and it includes both volatile and non-volatile media, removable and non-removable media.

System memory 310 can include computer system readable media in the form of volatile memory, such as random access memory (RAM) and/or cache memory. Web container system 110 may further include other removable/non-removable, volatile/non-volatile computer system storage media. In some examples, storage 260 may be included as part of memory 255 and may typically provide a non-volatile memory for the networked computing devices, and may include one or more different storage elements such as Flash memory, a hard disk drive, a solid state drive, an optical storage device, and/or a magnetic storage device. For example, storage system, storage 260, can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 650 by one or more data media interfaces. Storage 260 may include media for storing the web container repository, and the container data 322 (including the data for the various web containers 205, 210, 215, and 220).

Memory 255 may include a plurality of program modules 615 for performing various functions related to web container systems described herein. The program modules 615 generally include program code that is executable by one or more of the processing resources 250. As shown, program modules 615 include the various modules discussed in relation to FIG. 2A. The program modules 615 may also interact with each other and storage system, storage 260, to perform certain functions as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the web container system 110) or related data available in the cloud. For example, the web container module 201 and the web containers 205, 210, 215, and 220 could execute on a computing system in the cloud. In such a case, the web container module 201 and the web containers 205, 210, 215, and 220 could initiate web containers and store web container information including the web container repository at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving, at a computing device, a first domain address for a first internet-based resource;
determining that the first domain address is not associated with an initiated web container environment stored in a web container repository on the computing device by comparing the first domain address with a list of domain addresses associated with one or more initiated web container environments stored in the web container repository;

querying an owner database to determine a first owner for the first domain address;

querying a reverse-owner database for an associated set of domain addresses, wherein the reverse-owner database provides a return message comprising one or more domain addresses associated with the first owner;

initiating a first web container in an internet access application on the computing device for the first domain address and the associated set of domain addresses by allocating computing resources of the computing device for the first web container;

storing an identification of the first web container in the web container repository;

isolating network activity associated with the first internet-based resource and the associated set of domain addresses using the first web container by at least containing network interactions with the first internet-based resource and the associated set of domain addresses within the first web container;

storing data associated with the network activity in the first web container; and isolating network activity associated with a second internet-based resource using a second web container initiated in the internet access application.

2. The method of claim 1, wherein allocating computing resources for the first web container comprises:
   allocating computer storage for use by the first web container; and
   allocating computer processing resources for use by the first web container.

3. The method of claim 2, wherein isolating the network activity with the first internet-based resource using the first web container comprises:
   using the allocated computer storage and computer processing resources to interact with the first internet-based resource; and
   preventing the first internet-based resource from accessing non-allocated computer storage and computer processing resources.

4. The method of claim 1, wherein storing data associated with the network activity in the first web container comprises storing one or more of:
   a plurality of web-based tracking information;
   one or more browser extensions;
   a network access history; and
   user profile information for one or more internet-based resources.

5. The method of claim 1, further comprising:
   receiving a second domain address for a third internet-based resource;
   determining from the web container repository, that the second domain address is associated with the first web container;
   isolating network activity with the second internet-based resource using the first web container; and
   utilizing the data associated with the network activity for one or more network activity actions with the third internet-based resource.

6. The method of claim 5, wherein determining from the web container repository, that the second domain address is associated with the first web container comprises:
   comparing the second domain address to the first domain address and the associated set of domain addresses; and
   determining from the comparison that the second domain address is listed in the associated set of domain addresses.

7. The method of claim 1, wherein the owner database comprises a WHOIS database and wherein the reverse-owner database comprises a reverse WHOIS database.

8. A system comprising:
   a computer processor; and
   a memory containing a program which when executed by the computer processor performs an operation comprising:
      receiving, at a computing device, a first domain address for a first internet-based resource;
      determining that the first domain address is not associated with an initiated web container environment stored in a web container repository on the computing device by comparing the first domain address with a list of domain addresses associated with one or more initiated web container environments stored in the web container repository;
      querying an owner database to determine a first owner for the first domain address;
      querying a reverse-owner database for an associated set of domain addresses, wherein the reverse-owner database provides a return message comprising one or more domain addresses associated with the first owner;
      initiating a first web container in an internet access application on the computing device for the first domain address and the associated set of domain addresses by allocating computing resources of the computing device for the first web container;
      storing an identification of the first web container in the web container repository;
      isolating network activity associated with the first internet-based resource or the associated set of domain addresses using the first web container by at least containing network interactions with the first internet-based resource and the associated set of domain addresses within the first web container;
      storing data associated with the network activity in the first web container; and
      isolating network activity associated with a second internet-based resource using a second web container initiated in the internet access application.

9. The system of claim 8, wherein allocating computing resources for the first web container comprises:
   allocating computer storage for use by the first web container; and
   allocating computer processing resources for use by the first web container.

10. The system of claim 9, wherein isolating the network activity with the first internet-based resource using the first web container comprises:
    using the allocated computer storage and computer processing resources to interact with the first internet-based resource; and
    preventing the first internet-based resource from accessing non-allocated computer storage and computer processing resources.

11. The system of claim 8, wherein storing data associated with the network activity in the first web container comprises storing one or more of:
    a plurality of web-based tracking information;
    one or more browser extensions;
    a network access history; and user profile information for one or more internet-based resources.

12. The system of claim 8, wherein the operation further comprises:
receiving a second domain address for a third internet-based resource;
determining from the web container repository, that the second domain address is associated with the first web container;
isolating network activity with the second internet-based resource using the first web container; and
utilizing the data associated with the network activity for one or more network activity actions with the third internet-based resource.

13. The system of claim 12, wherein determining from the web container repository, that the second domain address is associated with the first web container comprises:
comparing the second domain address to the first domain address and the associated set of domain addresses; and
determining from the comparison that the second domain address is listed in the associated set of domain addresses.

14. The system of claim 8, wherein the owner database comprises a WHOIS database and wherein the reverse-owner database comprises a reverse WHOIS database.

15. A computer program product for permissioned image compilation, the computer program product comprising:
a non-transitory computer-readable storage medium having computer-readable program code embodied therewith, the computer-readable program code executable by one or more computer processors to perform an operation comprising:
receiving, at a computing device, a first domain address for a first internet-based resource;
determining that the first domain address is not associated with an initiated web container environment stored in a web container repository on the computing device by comparing the first domain address with a list of domain addresses associated with one or more initiated web container environments stored in the web container repository;
querying an owner database to determine a first owner for the first domain address;
querying a reverse-owner database for an associated set of domain addresses, wherein the reverse-owner database provides a return message comprising one or more domain addresses associated with the first owner;
initiating a first web container in an internet access application on the computing device for the first domain address and the associated set of domain addresses by allocating computing resources of the computing device for the first web container;
storing an identification of the first web container in the web container repository;
isolating network activity associated with the first internet-based resource or the associated set of domain addresses using the first web container by at least containing network interactions with the first internet-based resource and the associated set of domain addresses within the first web container;
storing data associated with the network activity in the first web containers; and
isolating network activity associated with a second internet-based resource using a second web container initiated in the internet access application.

16. The computer program product of claim 15, wherein allocating computing resources for the first web container comprises:
allocating computer storage for use by the first web container; and
allocating computer processing resources for use by the first web container.

17. The computer program product of claim 16, wherein isolating the network activity with the first internet-based resource using the first web container comprises:
using the allocated computer storage and computer processing resources to interact with the first internet-based resource; and
preventing the first internet-based resource from accessing non-allocated computer storage and computer processing resources.

18. The computer program product of claim 15, wherein storing data associated with the network activity in the first web container comprises storing one or more of:
a plurality of web-based tracking information;
one or more browser extensions;
a network access history; and
user profile information for one or more internet-based resources.

19. The computer program product of claim 15, wherein the operation further comprises:
receiving a second domain address for a third internet-based resource;
determining from the web container repository, that the second domain address is associated with the first web container;
isolating network activity with the second internet-based resource using the first web container; and
utilizing the data associated with the network activity for one or more network activity actions with the third internet-based resource.

20. The computer program product of claim 19, wherein determining from the web container repository, that the second domain address is associated with the first web container comprises:
comparing the second domain address to the first domain address and the associated set of domain addresses; and
determining from the comparison that the second domain address is listed in the associated set of domain addresses.

* * * * *